(12) United States Patent
Huang et al.

(10) Patent No.: US 12,219,441 B2
(45) Date of Patent: Feb. 4, 2025

(54) MODULE MANAGEMENT SYSTEM, MODULE MANAGEMENT METHOD, AND PROGRAM

(71) Applicant: NEC Corporation, Tokyo (JP)

(72) Inventors: Chenhui Huang, Tokyo (JP); Yuka Imai, Tokyo (JP); Toshinori Takemura, Tokyo (JP); Kentaro Nakahara, Tokyo (JP); Hannah Pokka, Tokyo (JP); Itsumi Haneda, Tokyo (JP); Akira Kamei, Tokyo (JP); Kenichiro Fukushi, Tokyo (JP); Hiroshi Kajitani, Tokyo (JP); Zhenwei Wang, Tokyo (JP); Koichi Morikawa, Tokyo (JP); Hiroshi Okuda, Tokyo (JP); Hiroaki Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 371 days.

(21) Appl. No.: 17/767,501

(22) PCT Filed: Oct. 21, 2019

(86) PCT No.: PCT/JP2019/041347
§ 371 (c)(1),
(2) Date: Apr. 8, 2022

(87) PCT Pub. No.: WO2021/079410
PCT Pub. Date: Apr. 29, 2021

(65) Prior Publication Data
US 2023/0188958 A1 Jun. 15, 2023

(51) Int. Cl.
*H04W 4/38* (2018.01)
*H04W 4/029* (2018.01)

(52) U.S. Cl.
CPC ............. *H04W 4/38* (2018.02); *H04W 4/029* (2018.02)

(58) Field of Classification Search
None
See application file for complete search history.

(56) References Cited

U.S. PATENT DOCUMENTS

2011/0224481 A1* 9/2011 Lee .................. G02C 11/06
600/25
2013/0325407 A1* 12/2013 Lee .................. G06F 17/00
702/188

(Continued)

FOREIGN PATENT DOCUMENTS

| JP | 2008-028724 A | 2/2008 |
| JP | 2011-217120 A | 10/2011 |
| JP | 2019-012891 A | 1/2019 |

OTHER PUBLICATIONS

International Search Report for PCT Application No. PCT/JP2019/041347, mailed on Nov. 19, 2019.

*Primary Examiner* — Michael J Moore, Jr.
*Assistant Examiner* — Gautam Sharma
(74) *Attorney, Agent, or Firm* — Sughrue Mion, PLLC

(57) ABSTRACT

A mobile terminal acquires a schedule of a user using a module device that includes a sensor, and instructs the module device to initiate a process for determining when to start or when to stop transmitting sensing information detected by the sensor to a communication destination, on the basis of the schedule. The module device acquires the sensing information, and initiates the process for determining when to start or when to stop transmitting the sensing information to the communication destination, on the basis of the instruction to initiate the determination process.

9 Claims, 8 Drawing Sheets

(56) References Cited

U.S. PATENT DOCUMENTS

| | | | |
|---|---|---|---|
| 2014/0279740 A1* | 9/2014 | Wernevi | G06F 17/18 |
| | | | 706/12 |
| 2015/0119198 A1* | 4/2015 | Wisbey | A61B 5/1118 |
| | | | 482/9 |
| 2016/0135109 A1* | 5/2016 | Hampel | H04W 40/22 |
| | | | 370/315 |
| 2016/0205500 A1 | 7/2016 | Lee et al. | |
| 2018/0113172 A1* | 4/2018 | Cronin | G01R 31/3646 |
| 2018/0268626 A1* | 9/2018 | Arashima | G08G 1/0112 |
| 2021/0160042 A1* | 5/2021 | Sugata | H04L 7/0033 |
| 2021/0410179 A1* | 12/2021 | Fong | H04L 5/0044 |
| 2023/0073352 A1* | 3/2023 | Wei | H04W 52/0216 |
| 2023/0188958 A1* | 6/2023 | Huang | H04W 48/04 |
| | | | 455/456.3 |

* cited by examiner

MODULE MANAGEMENT SYSTEM, MODULE MANAGEMENT METHOD, AND PROGRAM

This application is a National Stage Entry of PCT/JP2019/041347 filed on Oct. 21, 2019, the contents of all of which are incorporated herein by reference, in their entirety.

TECHNICAL FIELD

The present invention relates to a module management system, a module management method, and a program.

BACKGROUND ART

In order to measure the state of a human body, it has been proposed to attach a modular device including sensors that detect states to the human body. Such a modular device wirelessly transmits sensing information detected by the sensors to a mobile terminal or the like. However, there are places where devices are not allowed to make wireless transmissions. For example, in an aircraft, devices are prohibited from making wireless transmissions. A technique relevant to this is disclosed in Patent Document 1. Patent Document 1 discloses a technique for setting whether or not to allow use of a wireless interface.

CITATION LIST

Patent Literature

[Patent Document 1] Japanese Unexamined Patent Application, First Publication No. 2019-12891

SUMMARY OF THE INVENTION

Problems to be Solved by the Invention

Module devices such as the one mentioned above are often small in size and do not have an interface such as a liquid crystal screen. Therefore, there has been a demand for a technique that eliminates the cumbersomeness of setting wireless transmission of sensing information of a module device.

It is thus an example of an exemplary object of the present invention to provide a module management system, a module management method, and a program for solving the problem mentioned above.

Means for Solving the Problems

According to a first exemplary aspect of the present exemplary embodiment, a module management system includes: a schedule acquisition unit configured to acquire a schedule of a user using a module device that includes a sensor; and an instruction unit configured to instruct the module device to initiate a process for determining when to start or when to stop transmitting sensing information detected by the sensor to a communication destination, on the basis of the schedule.

According to a second exemplary aspect of the present exemplary embodiment, a module management method includes: acquiring a schedule of a user using a module device that includes a sensor; and instructing the module device to initiate a process for determining when to start or when to stop transmitting sensing information detected by the sensor to a communication destination, on the basis of the schedule.

According to a third exemplary aspect of the present exemplary embodiment, a program causes a computer included in a module management system to function as: a schedule acquisition means that acquires a schedule of a user using a module device that includes a sensor; and an instruction means that instructs the module device to initiate a process for determining when to start or when to stop transmitting sensing information detected by the sensor to a communication destination, on the basis of the schedule.

Advantageous Effects of Invention

According to the present invention, it is possible to eliminate the cumbersomeness of setting wireless transmission of sensing information of the module device.

EXAMPLE EMBODIMENT

Hereunder, a module management system according to an exemplary embodiment of the present invention will be described.

Figure 1:
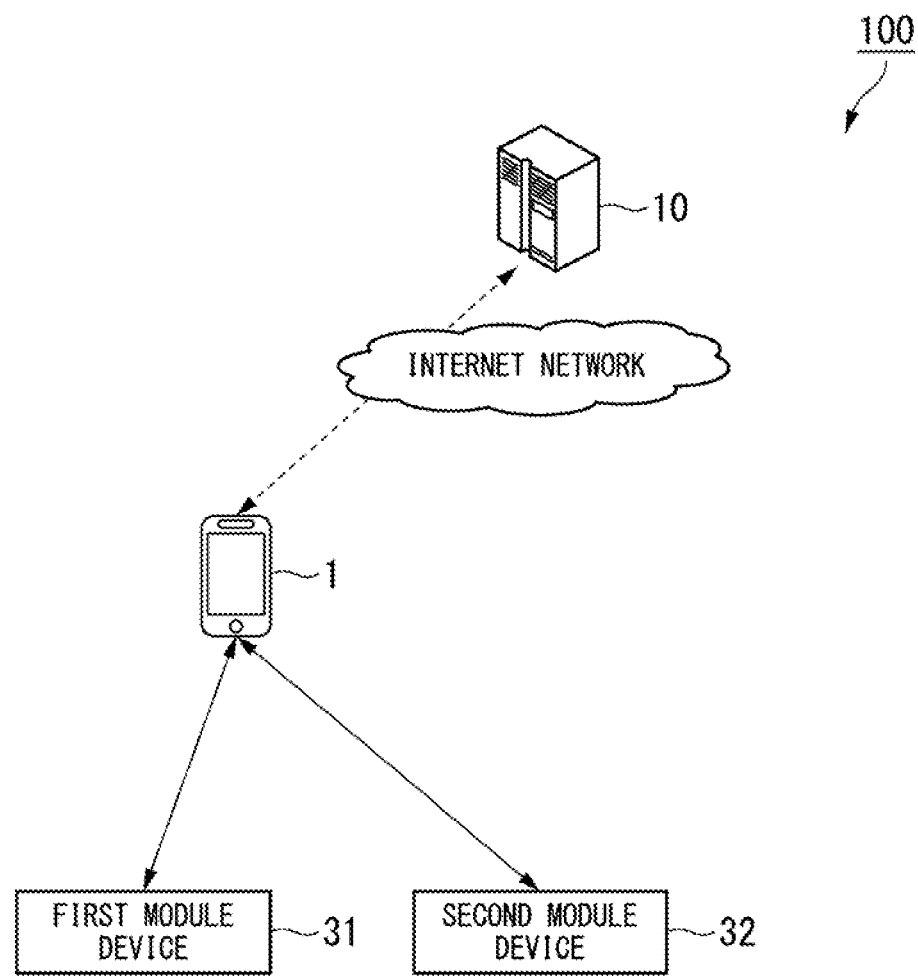
FIG. 1 is a diagram showing a schematic configuration of a module management system according to an exemplary embodiment of the present invention.

FIG. 1 is a diagram showing a schematic configuration of the module management system according to the exemplary embodiment.

As shown in FIG. 1, a module management system 100 includes at least a mobile terminal 1, and a first module device 31 and a second module device 32 attached respectively to left and right shoes.

The first module device 31 and the second module device 32 are collectively referred to simply as module devices 3. In the present exemplary embodiment, an example will be described in which the module management system 100 includes two module devices 3, however, the module management system 100 may include only one module device 3.

The mobile terminal 1 is a computer carried and transported by a user. The mobile terminal 1 connects to and communicates with a cloud server 10 and other computers connected to the Internet network, primarily via a public wireless communication network. The mobile terminal 1 also wirelessly connects to and communicates with the first module device 31 and the second module device 32, and receives sensing information transmitted from those module devices 3. The mobile terminal 1 uploads received sensing information to the cloud server 10.

Figure 2:
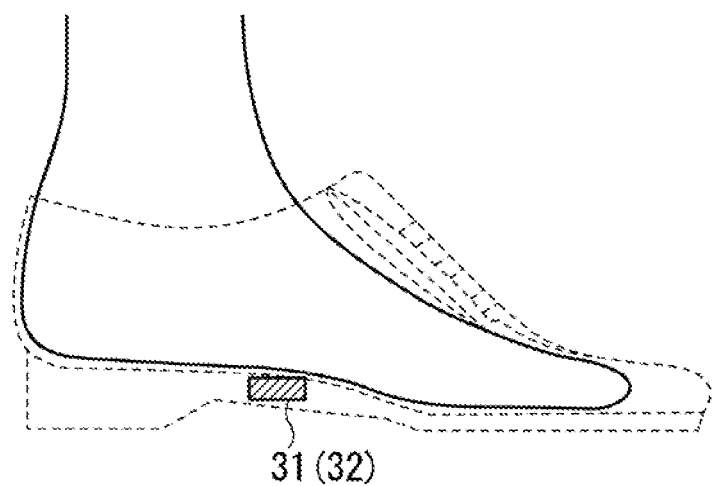
FIG. 2 is a diagram showing a brief overview of a module device included in a shoe sole according to an exemplary embodiment of the present invention.

FIG. 2 is a diagram showing a brief overview of a module device installed in a shoe sole.

As shown in FIG. 2, the first module device 31 is attached to the sole of a left shoe and the second module device 32 to the sole of a right shoe. The first module device 31 and the second module device 32 connect to and communicate with the mobile terminal 1 or a fixed device 2 by means of wireless communication. In the present exemplary embodiment, the module devices 3 including the first module device 31 and the second module device 32 transmit to the mobile terminal 1 sensing information including at least the acceleration and angular velocity of the user's feet when the user walks.

Figure 3:
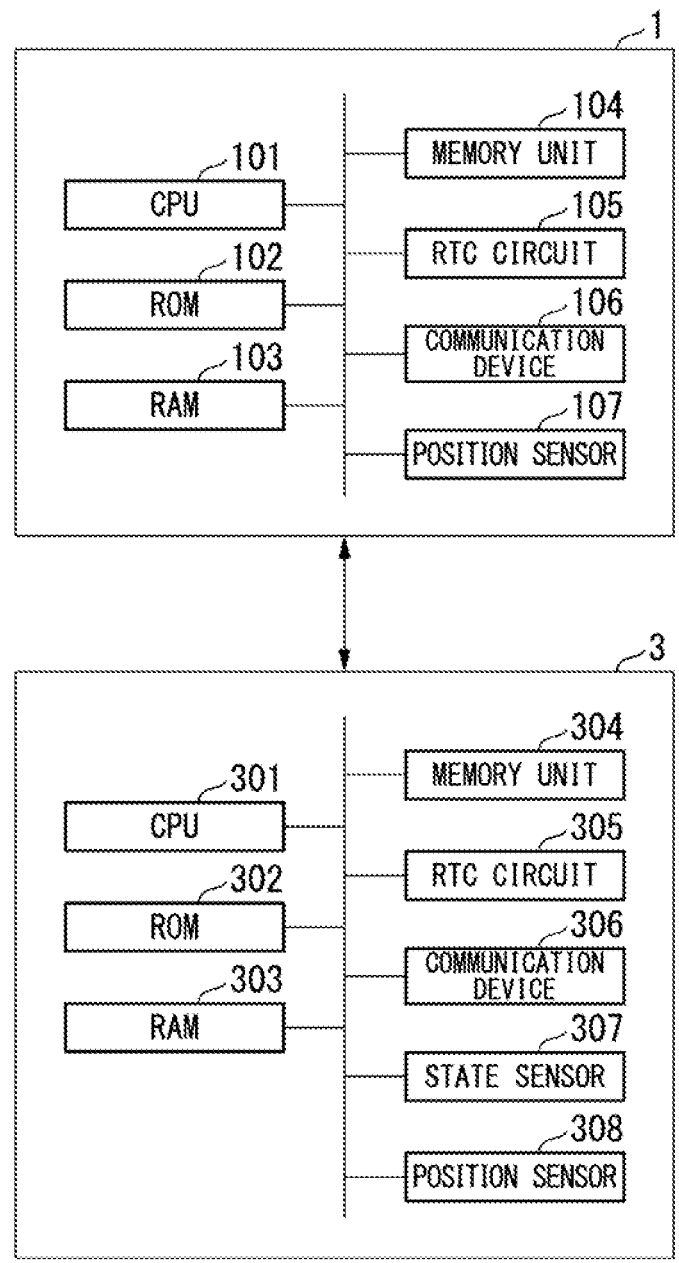
FIG. 3 is a hardware configuration diagram of a mobile terminal and a module device according to an exemplary embodiment of the present invention.

FIG. 3 is a hardware configuration diagram of the mobile terminal and the module device.

The mobile terminal 1 is a computer that includes hardware such as a CPU (Central Processing Unit) 101, a ROM (Read Only Memory) 102, a RAM (Random Access Memory) 103, a memory unit 104, an RTC (Real Time Clock) circuit 105, a communication device 106, and a location sensor 107.

Moreover, each module device 3 is a computer that includes hardware such as a CPU 301, a ROM 302, a RAM 303, a memory unit 304, an RTC circuit 305, a communication device 306, a status sensor 307, and a location sensor 308. In the present exemplary embodiment, the modular devices 3 include an inertial measurement unit (IMU) that senses acceleration and angular velocity on the basis of the movement of the foot when the user walks. The inertial measurement unit includes a state sensor 307. The state sensor 307 senses the acceleration and the angular velocity of the foot and generates sensing information including those values. The location sensor 308 detects a position on the basis of signals received from artificial satellites such as GNSS (Global Navigation Satellite System).

Figure 4:
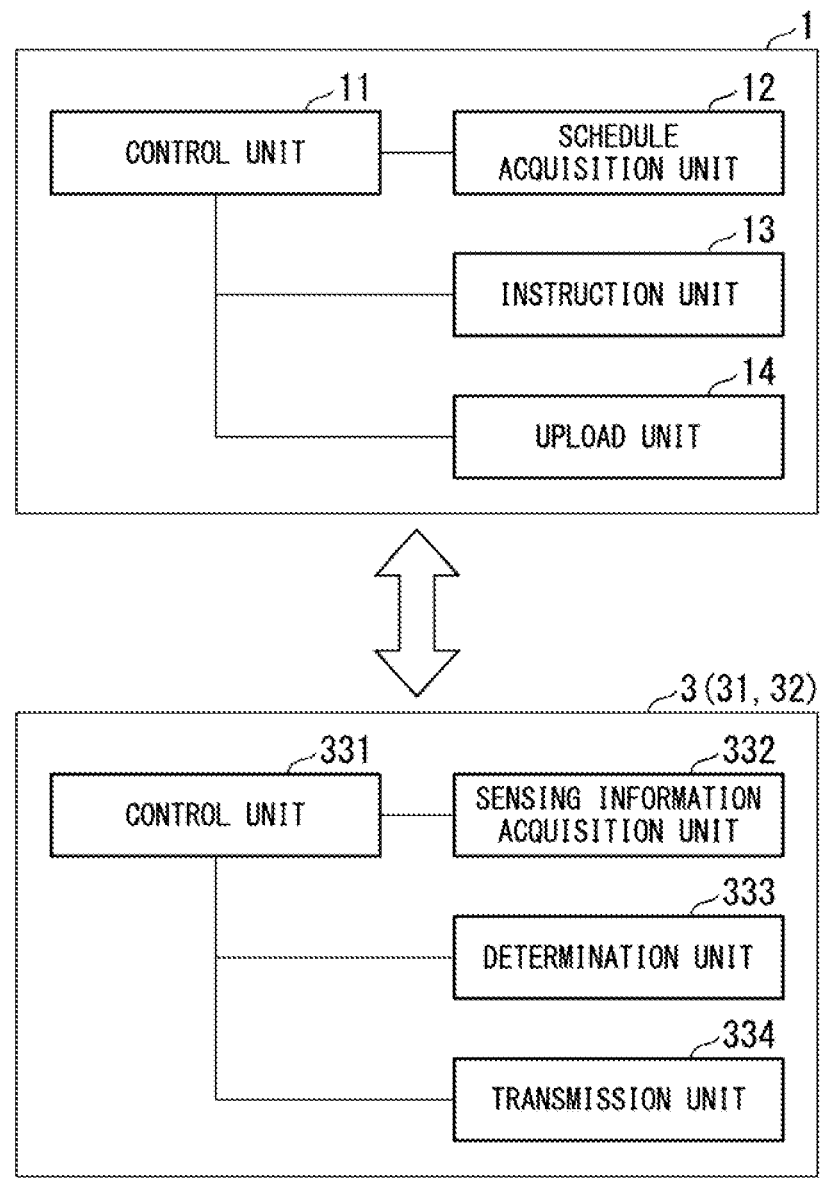
FIG. 4 is a functional block diagram of a mobile terminal and a module device according to an exemplary embodiment of the present invention.

FIG. 4 is a functional block diagram of the mobile terminal and the module device.

The mobile terminal 1 executes a module management program that is preliminarily stored. As a result, the mobile terminal 1 exerts at least the functions of a control unit 11, a schedule acquisition unit 12, an instruction unit 13, and an upload unit 14.

The control unit 11 controls each function of the mobile terminal 1.

The schedule acquisition unit 12 acquires a schedule of a user using the module device 3.

The instruction unit 13 instructs the module device 3 to initiate a process for determining when to start or when to stop transmitting sensing information detected by the state sensor 307 of the module device 3 to a communication destination, on the basis of the schedule. In the present exemplary embodiment, the communication destination is the mobile terminal 1.

The upload unit 14 uploads sensing information received from the module device 3 to the cloud server 10.

The module device 3 executes a sensing program that is preliminarily stored. As a result, the module device 3 includes at least a control unit 331, a sensing information acquisition unit 332, a determination unit 333, and a transmission unit 334.

The control unit 331 controls each function of the module device 3.

The sensing information acquisition unit 332 acquires, from the IMU including the state sensor 307 and the location sensor 308, sensing information including the acceleration and angular velocity on the basis of the movement of the left and right foot when the user walks.

On the basis of an instruction to initiate the process for determining when to start or when to stop transmitting sensing information to a communication destination, the determination unit 333 initiates the process for determining when to start or when to stop transmitting the sensing information to the mobile terminal 1.

The transmission unit 334 transmits the sensing information to the mobile terminal 1.

In the module management system 100 according to the present exemplary embodiment, the mobile terminal 1 acquires the schedule of the user using the module device 3. On the basis of the schedule, the mobile terminal 1 instructs the module device 3 to initiate the process for determining when to start or when to stop transmitting the sensing information detected by the module device 3 to the mobile terminal 1. For example, the mobile terminal 1 acquires the user's schedule related to aircraft boarding, and on the basis of the schedule, instructs the module device 3 to initiate the process for determining when to start or when to stop transmitting sensing information detected by the state sensor 307 to the communication destination.

The module device 3 acquires the sensing information, and on the basis of an instruction to initiate the process for determining when to start or when to stop transmission to the mobile terminal 1, initiates the process for determining when to start or when to stop transmitting the sensing information to the mobile terminal 1. Such processing does not require the user to set when to start or when to stop wireless transmission via the interface of the mobile terminal 1 or the module device 3, and therefore, it is possible to eliminate the cumbersomeness of setting whether or not to cause the module device 3 to perform wireless transmission of sensing information.

First Exemplary Embodiment

Figure 5:
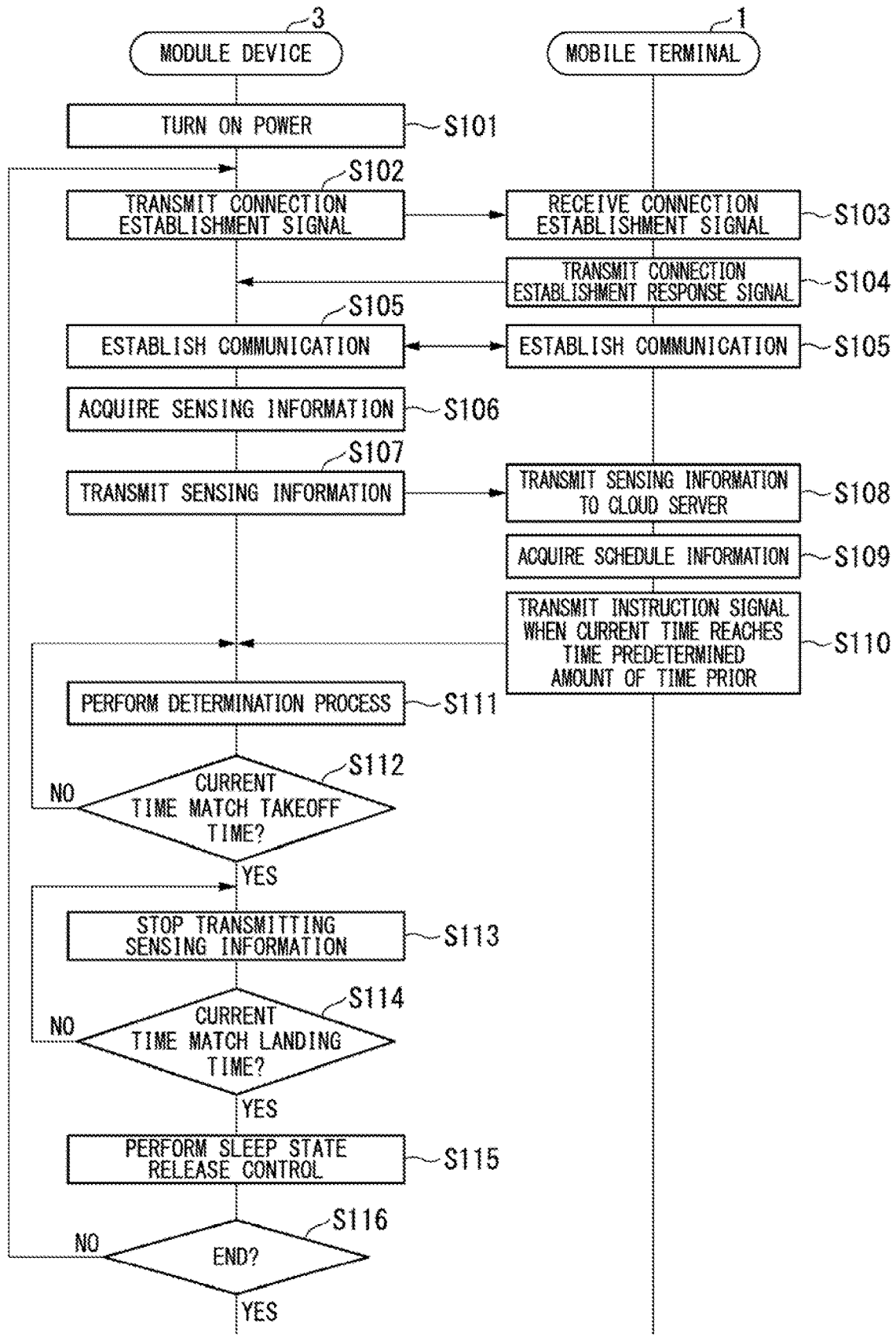
FIG. 5 is a diagram showing a processing flow of each device in a module management system of a first exemplary embodiment.

FIG. 5 is a diagram showing a processing flow of each device in a module management system of a first exemplary embodiment.

The user turns on the power of the first module device 31 and the second module device 32 (Step S101). As a result, the communication device 306 of the respective module devices 3, that is, the first module device 31 and the second module device 32, transmits a connection establishment signal (Step S102). The communication device 306 transmits the connection establishment signal to the mobile terminal 1, using a wireless communication function such as BLE (Bluetooth Low Energy; registered trademark) or Wi-Fi (registered trademark), for example. The module devices 3 may be provided with a function of sensing acceleration and also turning on the power automatically if it is in a period during which activation thereof is possible. As a result, the module device 3 can be activated without the user having to manually turn on the power of the module device 3.

The communication device 106 of the mobile terminal 1 receives the connection establishment signal (Step S103). The control unit 11 of the mobile terminal 1 detects the connection establishment signal having been received. Upon detecting the connection establishment signal having been received, the control unit 11 of the mobile terminal 1 transmits a normal connection establishment response signal to the module device 3 (Step S104). The control unit 331 of the module device 3 receives the connection establishment response signal. The control unit 331 of the module device 3 then connects to and communicates with the mobile terminal 1, using a communication protocol for establishing connection (Step S105).

In the module device 3, in the state of being connected to and communicating with the mobile terminal 1, the sensing information acquisition unit 332 acquires sensing information from the state sensor 307 (Step S106). The sensing information acquisition unit 332 outputs the sensing information to the transmission unit 334. The transmission unit 334 transmits the sensing information to the mobile terminal 1 (Step S107). The upload unit 14 of the mobile terminal 1 transmits the sensing information to the cloud server 10 (Step S108).

As a result, the sensing information is transmitted to the mobile terminal 1 while the mobile terminal 1 and the module device 3 are connected to and communicating with each other. The cloud server 10 performs predetermined processing using the acceleration and the angular velocity included in the sensing information. As an example, the predetermined processing may be a calculation of a stance-leg period or a swing-leg period of a foot, using the acceleration and the angular velocity of the foot, or a state of walking on the basis of those periods.

Meanwhile, the schedule acquisition unit 12 of the mobile terminal 1 has preliminarily stored the address of an acquisition destination from which schedule information is to be acquired. As an example, the acquisition destination is, for example, the cloud server 10. The cloud server 10 has therein recorded schedule information including the takeoff time at the takeoff airport, the landing time at the landing airport, the location information of the takeoff airport (latitude, longitude, altitude), and the location information of the landing airport (latitude, longitude, altitude) of the aircraft on which the user is boarding. The schedule acquisition unit 12 transmits a schedule information transmission request to the cloud server 10. This transmission request includes the ID of the user who uses the mobile terminal 1. The cloud server 10 detects the user's ID included in the transmission request. The cloud server 10 reads schedule information that is stored in a database and is associated with the user's ID, and sends it to the mobile terminal 1.

The schedule acquisition unit 12 of the mobile terminal 1 acquires the schedule information received from the cloud server 10 (step S109). The schedule acquisition unit 12 outputs the schedule information to the instruction unit 13. The instruction unit 13 acquires the takeoff time at the takeoff airport, the landing time at the landing airport, the location information of the takeoff airport (latitude, longitude, altitude) and the location information of the landing airport (latitude, longitude, altitude) of the aircraft on which the user is boarding, which are included in the schedule information. The instruction unit 13 acquires the current time from the RTC circuit 105 and acquires the location information of the mobile terminal 1 from the location sensor 107. Using the takeoff time, the landing time, the location information of the takeoff airport, the location information of the landing airport, the current time, and the location information of the device itself, the instruction unit 13 instructs the module device 3 to initiate the process for determining when to start or when to stop transmitting the sensing information to the communication destination.

Specifically, the instruction unit 13 of the mobile terminal 1 compares the current time with the takeoff time. When the current time reaches a time a predetermined amount of time prior thereto, such as 15 minutes before the takeoff time, the instruction unit 13 transmits to the module device 3 an instruction signal instructing it to initiate the process for determining when to start or when to stop transmitting sensing information (Step S110). The instruction signal may include a takeoff time and a landing time. The module device 3 receives the instruction signal. The determination unit 333 of the module device 3 acquires the information (such as takeoff time and landing time) included in the instruction signal. Then, the module device 3 initiates the determination process (Step S111).

For example, the determination unit 333 acquires the current time from the RTC circuit 305. The determination unit 333 compares the current time with the takeoff time to thereby determine whether the current time matches the takeoff time (Step S112). If the current time matches the takeoff time, the determination unit 333 determines to stop transmitting sensing information to the mobile terminal 1 (Step S113). If the current time does not match the takeoff time, the determination unit 333 repeats transmission of sensing information to the mobile terminal 1. If the current time matches the takeoff time, the determination unit 333 records the landing time in the RAM 303 or the like. The determination unit 333 outputs to the control unit 331 an instruction to transition to the sleep state.

The control unit 331 performs control so that the module device 3 continues to stay in the sleep state until the current time reaches the landing time. For example, the control unit 331 controls the communication device 306, the state sensor 307, and the location sensor 308 to stop from operating. As a result, the module device 3 stops communication connection with the mobile terminal 1 and stops transmitting sensing information to the mobile terminal 1.

The control unit 331 determines whether the time measured by the RTC circuit 305 has reached the landing time (Step S114). The control unit 331 initiates the control to release the sleep state when the current time reaches the landing time (Step S115). The control unit 331 instructs the communication device 306, the state sensor 307, and the location sensor 308 to activate. As a result, the communication device 306, the state sensor 307, and the location sensor 308 of the module device 3 activate. The control unit 331 determines whether to end the process (Step S116). In the case where the processing is not to end, the control unit 331 resumes acquisition and transmission of sensing information.

That is to say, the communication device 306 of the module devices 3 transmits a connection establishment signal. The communication device 106 of the mobile terminal 1 receives the connection establishment signal. The control unit 11 of the mobile terminal 1 detects the connection establishment signal having been received. Upon detecting the connection establishment signal having been received, the control unit 11 of the mobile terminal 1 transmits a normal connection establishment response signal to the module device 3. The control unit 331 of the module device 3 receives the connection establishment response signal. The control unit 331 of the module device 3 then connects to and communicates with the mobile terminal 1, using a communication protocol for establishing connection. As a result, communication connection between the mobile terminal 1 and the module device 3 is established again.

In the module device 3, in the state of being connected to and communicating with the mobile terminal 1, the sensing information acquisition unit 332 acquires sensing information from the state sensor 307. The sensing information acquisition unit 332 outputs the sensing information to the transmission unit 334. The transmission unit 334 transmits the sensing information to the mobile terminal 1. The upload unit 14 of the mobile terminal 1 transmits the sensing information to the cloud server 10.

In the case where schedule information includes a plurality of schedules related to the user, the instruction unit 13 of the mobile terminal 1 determines whether the current time has reached a time a predetermined amount of time prior thereto, such as 15 minutes before the takeoff time, on the basis of the next schedule. When the current time reaches a time a predetermined amount of time prior thereto, such as 15 minutes before the takeoff time, the instruction unit 13 transmits to the module device 3 an instruction signal instructing it to initiate the process for determining when to start or when to stop transmitting sensing information. The mobile terminal 1 may periodically acquire the user's schedule information from the cloud server 10. In the present exemplary embodiment, schedule information is acquired from the cloud server 10, however, the user's schedule information may be acquired from a web server or the like managed by the airline company.

According to the processing described above, the module device 3 detects a sensing information transmission stop period indicated by a takeoff time and a landing time after the user boarded the aircraft. Moreover, the module device 3 resumes acquisition of sensing information and transmission to the mobile terminal 1 after the transmission stop period. As a result, in a situation where wireless transmission is prohibited, such as when boarding an aircraft, the user does not need to perform an operation to turn off the power of the module device 3, an operation to cause either one of the module devices 3 to stop performing wireless transmission, and an operation to cause the module device 3 to resume transmission of sensing information to the mobile terminal 1. Therefore, according to the module management system 100 described above, it is possible to eliminate the cumbersomeness of setting wireless transmission of sensing information of the module device 3.

According to the above processing, the determination unit 333 of the module device 3 determines whether the current time has reached the takeoff time, and when the current time reaches the takeoff time, the determination unit 333 of the module device 3 determines to transition to the sleep state. However, the instruction unit 13 of the mobile terminal 1 may determine whether the current time has reached the takeoff time and determine to transition to the sleep state. In such a case, when the current time matches the takeoff time, the instruction unit 13 of the mobile terminal 1 may determine to transition to the sleep state and transmit to the module device 3 an instruction signal that indicates the transition to the sleep state and includes the landing time. When an instruction signal is received, the control unit 331 of the module device 3 similarly performs the control to transition to the sleep state and the control to resume transmission of sensing information.

Moreover, according to the processing described above, the control unit 331 of the module device 3 initiates the control to release the sleep state when the current time matches the landing time. However, the instruction unit 13 of the mobile terminal 1 may compare the current time with the landing time, and instruct the module device 3 to release the sleep state when those times match. In such a case, when transitioning to the sleep state, the instruction unit 13 of the mobile terminal 1 stops the transmission function of the communication device 306 only, and controls the receiving function to be in the operating state. Accordingly, on the basis of the reception of a sleep state release signal transmitted by the mobile terminal 1, the control unit 331 of the module device 3 may recognize the signal, release the sleep state, and activate the communication device 306.

Also in the case where the module device 3 transitions to the sleep state, the control unit 331 of the module device 3 may drive the state sensor 307 and the location sensor 308 and control the transmission/reception functions or only the transmission function of the communication device 306 to be in the sleep state. In such a case, the sensing information acquisition unit 332 of the module device 3 may acquire sensing information from the state sensor 307 or the location sensor 308 and record it in the memory unit 304 of the module device itself. Then, when the communication connection with the mobile terminal 1 is resumed, the control unit 331 of the module device 3 may transmit the sensing information of the state sensor 307 stored in the sleep state to the mobile terminal 1.

According to the processing described above, the mobile terminal 1 and the module device 3 control wireless transmission of the module device 3 at least to be in the sleep state during the period between the takeoff time and the landing time. However, the control may be performed where a period between the time a predetermined amount of time prior to the takeoff time and the time a predetermined amount of time after the landing time, is taken as a period during which wireless transmission of the module device 3 is controlled to be in the sleep state.

Second Exemplary Embodiment

Figure 6:
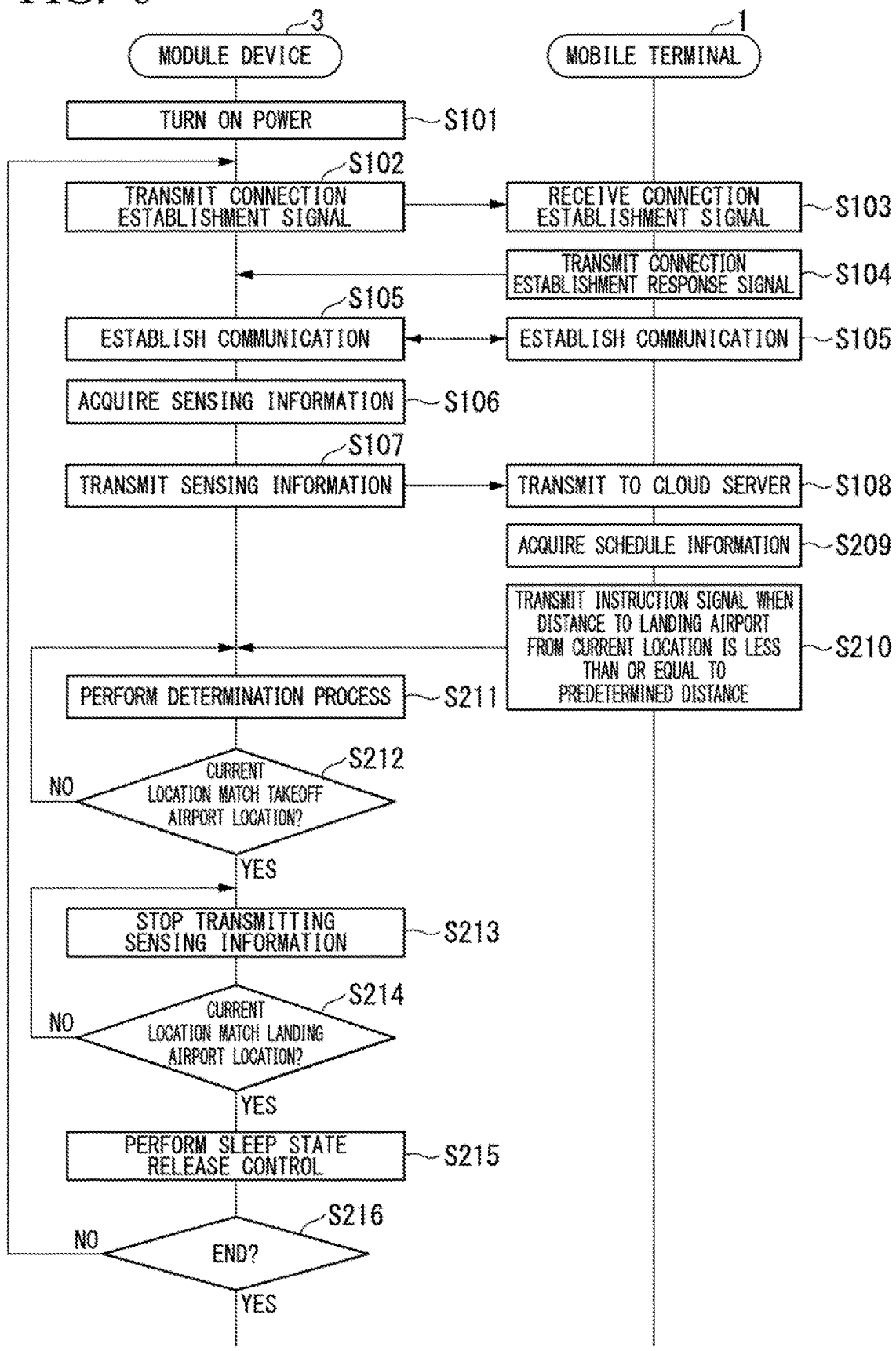
FIG. 6 is a diagram showing a processing flow of each device in a module management system of a second exemplary embodiment.

FIG. 6 is a diagram showing a processing flow of each device in a module management system of a second exemplary embodiment.

The processing of the module management system 100 in the second exemplary embodiment is the same as that from Step S101 to Step S108.

The schedule acquisition unit 12 of the mobile terminal 1 acquires the schedule information received from the cloud server 10 (Step S209). The schedule acquisition unit 12 outputs the schedule information to the instruction unit 13. The instruction unit 13 acquires the takeoff time at the takeoff airport, the landing time at the landing airport, the location information of the takeoff airport (latitude, longitude, altitude) and the location information of the landing airport (latitude, longitude, altitude) of the aircraft on which the user is boarding, which are included in the schedule information. The instruction unit 13 acquires the current time from the RTC circuit 105 and acquires the location information of the mobile terminal 1 from the location sensor 107. Using the takeoff time, the landing time, the location information of the takeoff airport, the location information of the landing airport, the current time, and the location information of the device itself, the instruction unit 13 instructs the module device 3 to initiate the process for determining when to start or when to stop transmitting the sensing information to the communication destination.

Specifically, the instruction unit 13 of the mobile terminal 1 compares the location information of the takeoff airport with the location information of the landing airport. When the distance between the current location and the location information of the takeoff airport becomes equal to or less than a predetermined distance, the instruction unit 13 transmits to the module device 3 an instruction signal instructing it to initiate the process for determining when to start or when to stop transmitting sensing information (Step S210). The instruction signal may include the location information of the takeoff airport and the location information of the landing airport. The module device 3 receives the instruction signal. The determination unit 333 of the module device 3 acquires the information (such as the location information of the takeoff airport and the location information of the landing airport) included in the instruction signal. Then, the module device 3 initiates the determination process (Step S211).

For example, the determination unit 333 acquires the current location from the location sensor 308. The determination unit 333 compares the current location with the location information of the takeoff airport to thereby determine whether the current location matches the location information of the takeoff airport (Step S212). If the current location matches the location information of the takeoff airport, the determination unit 333 determines to stop transmitting sensing information to the mobile terminal 1 (Step S213). If the current location does not match the location information of the takeoff airport, the determination unit 333 determines to repeat transmission of sensing information to the mobile terminal 1. If the current location matches the location information of the takeoff airport, the determination unit 333 records the location information of the landing airport in the RAM 303 or the like. The determination unit 333 outputs to the control unit 331 an instruction to transition to the sleep state.

The control unit 331 performs control so that the module device 3 continues to stay in the sleep state until the current location matches the location information of the landing airport. For example, the control unit 331 controls the communication device 306, the state sensor 307, and the location sensor 308 to stop from operating. As a result, the module device 3 stops communication connection with the mobile terminal 1 and stops transmitting sensing information to the mobile terminal 1.

The control unit 331 determines whether the location information detected by the location sensor 308 matches the location information of the landing airport (Step S214). The control unit 331 initiates the control to release the sleep state when the current location matches the location information of the landing airport (Step S215). The control unit 331 instructs the communication device 306, the state sensor 307, and the location sensor 308 to activate. As a result, the communication device 306, the state sensor 307, and the location sensor 308 of the module device 3 activate. The control unit 331 determines whether to end the process (Step S216). In the case where the processing is not to end, the control unit 331 resumes acquisition and transmission of sensing information.

According to the processing described above, the module device 3 automatically detects the travel section between the takeoff airport and the landing airport for the aircraft used by the user as a sensing information transmission stop section. Moreover, the module device 3 resumes acquisition of sensing information and transmission to the mobile terminal 1 after the current location reaches the landing airport. As a result, in a situation where wireless transmission is prohibited, such as when boarding an aircraft, the user does not need to perform an operation to turn off the power of the module device 3, an operation to cause either one of the module devices 3 to stop performing wireless transmission, and an operation to cause the module device 3 to resume transmission of sensing information to the mobile terminal 1. Therefore, according to the module management system 100 described above, it is possible to eliminate the cumbersomeness of setting wireless transmission of sensing information of the module device 3.

According to the processing described above, the determination unit 333 of the module device 3 determines whether the current location matches the location information of the takeoff airport, and when the current location reaches the location information of the takeoff airport, the determination unit 333 of the module device 3 determines to transition to the sleep state. However, the instruction unit 13 of the mobile terminal 1 may determine whether the current location has reached the location information of the takeoff airport and determine to transition to the sleep state. In such a case, if the current location matches the location information of the takeoff airport, the instruction unit 13 of the mobile terminal 1 may determine to transition to the sleep state and transmit to the module device 3 an instruction signal that indicates the transition to the sleep state and includes the location information of the landing airport. When an instruction signal is received, the control unit 331 of the module device 3 similarly performs the control to transition to the sleep state and the control to resume sensing information transmission.

Moreover, according to the processing described above, the control unit 331 of the module device 3 initiates the control to release the sleep state when the current location matches the location information of the landing airport. However, the instruction unit 13 of the mobile terminal 1 may compare the current location with the location information of the landing airport, and instruct the module device 3 to release the sleep state when those locations match. In such a case, when transitioning to the sleep state, the instruction unit 13 of the mobile terminal 1 stops the transmission function of the communication device 306 only, and controls the receiving function to be in the operating state. Accordingly, on the basis of receiving a sleep state release signal transmitted by the mobile terminal 1, the control unit 331 of the module device 3 may recognize the signal, release the sleep state, and activate the communication device 306.

Also in the case where the module device 3 transitions to the sleep state, the control unit 331 of the module device 3 may drive the state sensor 307 and the location sensor 308 and control the transmission/reception functions or only the transmission function of the communication device 306 to be in the sleep state. In such a case, the sensing information acquisition unit 332 of the module device 3 may acquire sensing information from the state sensor 307 or the location sensor 308 and record it in the memory unit 304 of the module device itself. Then, when the communication connection with the mobile terminal 1 is resumed, the control unit 331 of the module device 3 may transmit the sensing information of the state sensor 307 stored in the sleep state to the mobile terminal 1.

According to the processing described above, the mobile terminal 1 and the module device 3 control wireless transmission of the module device 3 at least to be in the sleep state while being in the section indicated by the location information of the takeoff airport and the location information of the landing airport. However, the control may be performed where a section that begins at a predetermined location nearer before reaching the location information of the takeoff airport, reaches the location information of the landing airport, and ends at a predetermined location out of the location of the landing airport thereafter, is taken as a section in which wireless transmission of the module device 3 is controlled to be in the sleep state. The processing may be performed such that the above match between the current location and the location information of the takeoff airport or the landing airport is treated as a match as long as it is within a predetermined distance.

Third Exemplary Embodiment

Figure 7:
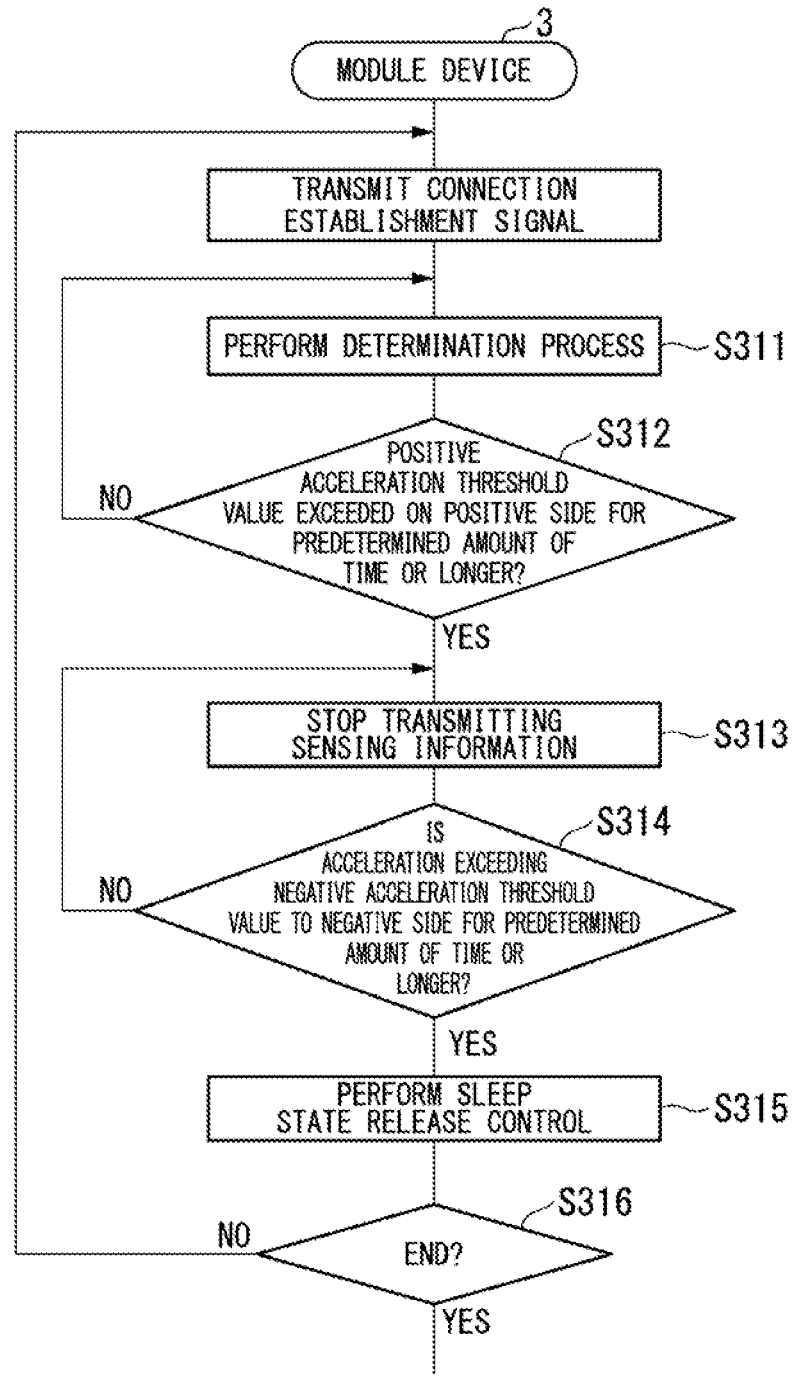
FIG. 7 is a diagram showing a processing flow of each device in a module management system of a third exemplary embodiment.

FIG. 7 is a diagram showing a processing flow of each device in a module management system of a third exemplary embodiment.

The processing of the module management system 100 in the third exemplary embodiment is the same as that from Step S101 to Step S110 in the first exemplary embodiment and that from Step S101 to Step S210 in the second exemplary embodiment. In the module management system 100 according to the third exemplary embodiment, the module device 3 determines whether to stop transmission of sensing information on the basis of acceleration, instead of the process that uses time information and location information to determine whether to stop transmission of sensing information.

Specifically, the instruction unit 13 of the mobile terminal 1 transmits to the module device 3 an instruction signal instructing it to initiate the process for determining when to start or when to stop transmitting sensing information. This instruction signal includes instruction information for performing a determination process that uses acceleration. The module device 3 receives an instruction signal. The determination unit 333 of the module device 3 detects that the determination process is to be performed using acceleration, on the basis of information included in the instruction signal. Then, the module device 3 initiates the determination process (Step S311).

In this determination process, the determination unit 333 acquires an acceleration from the state sensor 307. The determination unit 333 determines whether the amount of time during which acceleration is exceeding a predetermined positive acceleration threshold value on the positive side is equal to or greater than a predetermined amount of time (Step S312). By detecting the amount of time during which acceleration is exceeding the predetermined positive acceleration threshold value on the positive side is equal to or greater than the predetermined amount of time, it is possible to determine the aircraft as performing the takeoff operation. If the amount of time during which acceleration is exceeding the predetermined positive acceleration threshold value on the positive side is equal to or greater than the predetermined amount of time, the determination unit 333 determines to stop transmitting sensing information to the mobile terminal 1 (Step S313). If the amount of time during which acceleration is exceeding the predetermined positive acceleration threshold value on the positive side is not equal to or greater than the predetermined amount of time, the determination unit 333 repeats transmission of sensing information to the mobile terminal 1. If a determination to stop transmission of sensing information is made, the determination unit 333 outputs, to the control unit 331, an instruction to transition to the sleep state.

The control unit 331 performs control so that the module device 3 continues to stay in the sleep state until detecting the state where the amount of time during which the acceleration is exceeding a predetermined negative acceleration threshold value on the negative side is equal to or greater than a predetermined amount of time. For example, the control unit 331 controls the communication device 306, the state sensor 307, and the location sensor 308 to stop from operating. As a result, the module device 3 stops communication connection with the mobile terminal 1 and stops transmitting sensing information to the mobile terminal 1.

The control unit 331 determines whether the amount of time during which acceleration is exceeding the predetermined negative acceleration threshold value on the negative side is equal to or greater than the predetermined amount of time (Step S314). If the amount of time during which the acceleration is exceeding the predetermined negative acceleration threshold value on the negative side is equal to or greater than the predetermined amount of time, the control unit 331 initiates the control to release the sleep state (Step S115). The control unit 331 instructs the communication device 306, the state sensor 307, and the location sensor 308 to activate. As a result, the communication device 306, the state sensor 307, and the location sensor 308 of the module device 3 activate. The control unit 331 determines whether to end the process (Step S116). In the case where the processing is not to end, the control unit 331 resumes acquisition and transmission of sensing information.

That is to say, the communication device 306 of the module devices 3 transmits a connection establishment signal. The communication device 106 of the mobile terminal 1 receives the connection establishment signal. The control unit 11 of the mobile terminal 1 detects the connection establishment signal having been received. Upon detecting the connection establishment signal having been received, the control unit 11 of the mobile terminal 1 transmits a normal connection establishment response signal to the module device 3. The control unit 331 of the module device 3 receives the connection establishment response signal. The control unit 331 of the module device 3 then connects to and communicates with the mobile terminal 1, using a communication protocol for establishing connection. As a result, communication connection between the mobile terminal 1 and the module device 3 is established again.

In the module device 3, in the state of being connected to and communicating with the mobile terminal 1, the sensing information acquisition unit 332 acquires sensing information from the state sensor 307. The sensing information acquisition unit 332 outputs the sensing information to the transmission unit 334. The transmission unit 334 transmits the sensing information to the mobile terminal 1. The upload unit 14 of the mobile terminal 1 transmits the sensing information to the cloud server 10.

According to the processing described above, the module device 3 detects a sensing information transmission stop period from the time when the user boarded the aircraft and it takes off to the time it lands. Moreover, the module device 3 resumes acquisition of sensing information and transmission to the mobile terminal 1 after the transmission stop period. As a result, in a situation where wireless transmission is prohibited, such as when boarding an aircraft, the user does not need to perform an operation to turn off the power of the module device 3, an operation to cause either one of the module devices 3 to stop performing wireless transmission, and an operation to cause the module device 3 to resume transmission of sensing information to the mobile terminal 1. Therefore, according to the module management system 100 described above, it is possible to eliminate the cumbersomeness of setting wireless transmission of sensing information of the module device 3.

According to the above processing, the determination unit 333 of the module device 3 determines whether it is currently in a period of being on board the aircraft between takeoff and landing, on the basis of acceleration, and if it is determined as being in the period between takeoff and landing, the determination unit 333 of the module device 3 determines to transition to the sleep state. However, the instruction unit 13 of the mobile terminal 1 may perform a similar determination as to whether it is in a period between takeoff and landing, and a determination of transition to the sleep state. In such a case, if the amount of time during which the acceleration is exceeding the predetermined positive acceleration threshold value on the positive side is determined as being equal to or greater than the predetermined amount of time, the instruction unit 13 of the mobile terminal 1 may determine to transition to the sleep state and transmit to the module device 3 an instruction signal that indicates the transition to the sleep state and includes the landing time. When an instruction signal is received, the control unit 331 of the module device 3 similarly performs the control to transition to the sleep state and the control to resume sensing information transmission.

Moreover, according to the processing described above, if the amount of time during which acceleration is exceeding the predetermined negative acceleration threshold value on the negative side is determined as being equal to or greater than the predetermined amount of time, the control unit 331 of the module device 3 may instruct the module device 3 to release the sleep state. In such a case, when transitioning to the sleep state, the instruction unit 13 of the mobile terminal 1 stops the transmission function of the communication device 306 only, and controls the receiving function to be in the operating state. Accordingly, on the basis of the reception of a sleep state release signal transmitted by the mobile terminal 1, the control unit 331 of the module device 3 may recognize the signal, release the sleep state, and activate the communication device 306.

Also in the case where the module device 3 transitions to the sleep state, the control unit 331 of the module device 3 may drive the state sensor 307 and the location sensor 308 and control the transmission/reception functions or only the transmission function of the communication device 306 to be in the sleep state. In such a case, the sensing information acquisition unit 332 of the module device 3 may acquire sensing information from the state sensor 307 or the location sensor 308 and record it in the memory unit 304 of the module device itself. Then, when the communication connection with the mobile terminal 1 is resumed, the control unit 331 of the module device 3 may transmit the sensing information of the state sensor 307 stored in the sleep state to the mobile terminal 1.

Fourth Exemplary Embodiment

Figure 8:
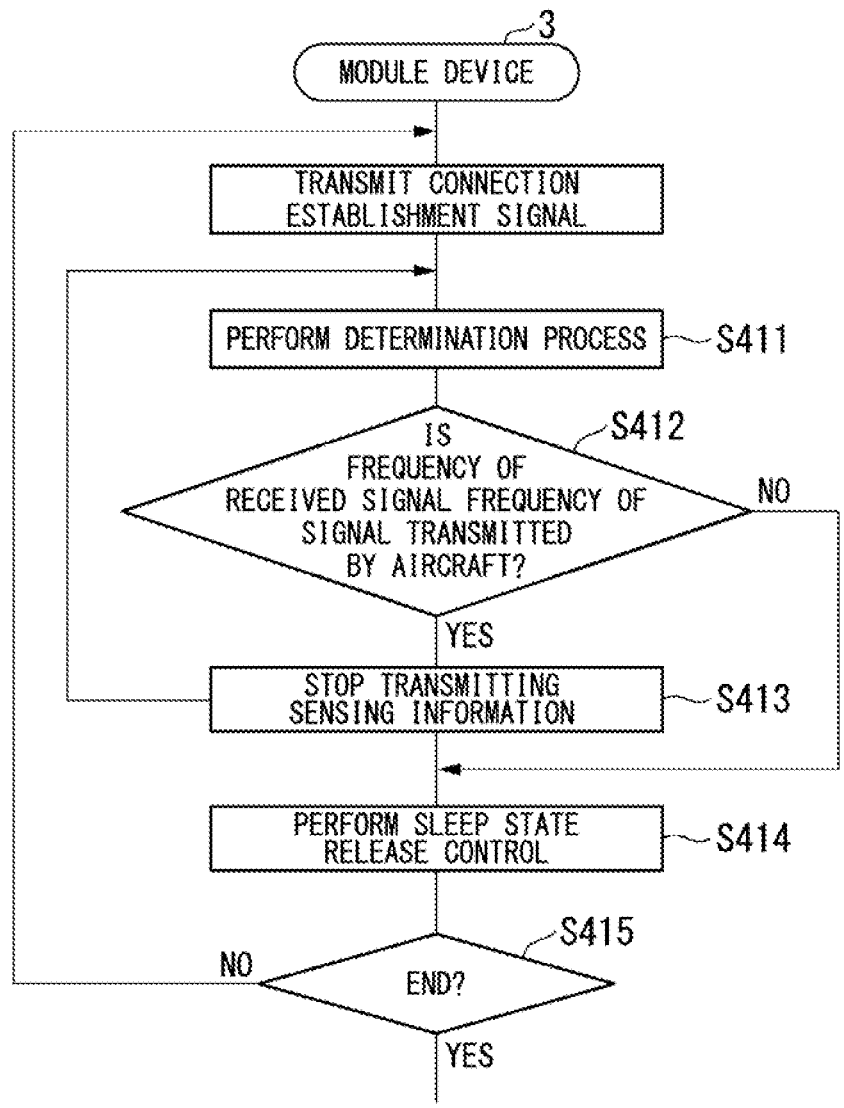
FIG. 8 is a diagram showing a processing flow of each device in a module management system of a fourth exemplary embodiment.

FIG. 8 is a diagram showing a processing flow of each device in a module management system of a fourth exemplary embodiment.

The processing of the module management system 100 in the fourth exemplary embodiment is the same as that from Step S101 to Step S110 in the first exemplary embodiment and that from Step S101 to Step S210 in the second exemplary embodiment. In the module management system 100 of the fourth exemplary embodiment, the module device 3 determines whether to stop transmission of sensing information on the basis of detecting the radio wave of a radio signal transmitted from an aircraft, instead of the process that uses time information and location information to determine whether to stop transmission of sensing information.

Specifically, the instruction unit 13 of the mobile terminal 1 transmits to the module device 3 an instruction signal instructing it to initiate the process for determining when to start or when to stop transmitting sensing information. This instruction signal includes instruction information for performing a determination process that uses the radio wave of a radio signal transmitted from the aircraft. The module device 3 receives the instruction signal. The determination unit 333 of the module device 3 detects that the determination process is to be performed using the radio wave of a radio signal transmitted from the aircraft, on the basis of information included in the instruction signal. Then, the module device 3 initiates the determination process (Step S411).

In this determination process, the determination unit 333 acquires the frequency of a signal detected by a radio signal receiving function of the communication device 306. The determination unit 333 determines whether the frequency of the received signal equates to the frequency of a signal transmitted from the aircraft (Step S412). By detecting the frequency of the received signal as equating to the frequency of a signal transmitted from the aircraft, it is possible to determine the user as being on board the aircraft. If the frequency of the received signal equates to the frequency of a signal transmitted from the aircraft, the determination unit 333 determines to stop transmission of sensing information to the mobile terminal 1 (Step S413). If the frequency of the received signal does not equate to the frequency of a signal transmitted from the aircraft, the determination unit 333 repeats transmission of sensing information to the mobile terminal 1. If a determination to stop transmission of sensing information is made, the determination unit 333 outputs, to the control unit 331, an instruction to transition to the sleep state.

The control unit 331 performs control so that the module device 3 continues to stay in the sleep state until the frequency of the received signal is determined as not equating to the frequency of a signal transmitted from the aircraft. For example, the control unit 331 controls the communication device 306, the state sensor 307, and the location sensor 308 to stop from operating. As a result, the module device 3 stops communication connection with the mobile terminal 1 and stops transmitting sensing information to the mobile terminal 1.

The control unit 331 repeatedly determines whether the frequency of the received signal equates to the frequency of a signal transmitted from the aircraft. If the frequency of the received signal does not equate to the frequency of a signal transmitted from the aircraft, the control unit 331 initiates the control to release the sleep state (Step S414). The control unit 331 instructs the communication device 306, the state sensor 307, and the location sensor 308 to activate. As a result, the communication device 306, the state sensor 307, and the location sensor 308 of the module device 3 activate. The control unit 331 determines whether to end the process (Step S415). In the case where the processing is not to end, the control unit 331 resumes acquisition and transmission of sensing information.

That is to say, the communication device 306 of the module devices 3 transmits a connection establishment signal. The communication device 106 of the mobile terminal 1 receives the connection establishment signal. The control unit 11 of the mobile terminal 1 detects the connection establishment signal having been received. Upon detecting the connection establishment signal having been received, the control unit 11 of the mobile terminal 1 transmits a normal connection establishment response signal to the module device 3. The control unit 331 of the module device 3 receives the connection establishment response signal. The control unit 331 of the module device 3 then connects to and communicates with the mobile terminal 1, using a communication protocol for establishing connection. As a result, communication connection between the mobile terminal 1 and the module device 3 is established again.

In the module device 3, in the state of being connected to and communicating with the mobile terminal 1, the sensing information acquisition unit 332 acquires sensing information from the state sensor 307. The sensing information acquisition unit 332 outputs the sensing information to the transmission unit 334. The transmission unit 334 transmits the sensing information to the mobile terminal 1. The upload unit 14 of the mobile terminal 1 transmits the sensing information to the cloud server 10.

According to the processing described above, the module device 3 detects a sensing information transmission stop period that corresponds to the period during which the user is on board the aircraft. Moreover, the module device 3 resumes acquisition of sensing information and transmission to the mobile terminal 1 after the transmission stop period. As a result, in a situation where wireless transmission is prohibited, such as when boarding an aircraft, the user does not need to perform an operation to turn off the power of the module device 3, an operation to cause either one of the module devices 3 to stop performing wireless transmission, and an operation to cause the module device 3 to resume transmission of sensing information to the mobile terminal 1. Therefore, according to the module management system 100 described above, it is possible to eliminate the cumbersomeness of setting wireless transmission of sensing information of the module device 3.

According to the processing described above, the determination unit 333 of the module device 3 determines whether the frequency of the received signal equates to the frequency of a signal transmitted from the aircraft, and if the frequency of the received signal is determined as equating to the frequency of a signal transmitted from the aircraft and this determines the user as being on board the aircraft, the determination unit 333 of the module device 3 determines to transition to the sleep state. However, the instruction unit 13 of the mobile terminal 1 may determine whether the frequency of the received signal equates to the frequency of a signal transmitted from the aircraft and determine to transition to the sleep state. In such a case, if the frequency of the signal received by the communication device 106 is determined as equating to the frequency of a signal transmitted from the aircraft, the instruction unit 13 of the mobile terminal 1 may determine to transition to the sleep state and transmit to the module device 3 an instruction signal that indicates a transition to the sleep state. When an instruction signal is received, the control unit 331 of the module device 3 similarly performs the control to transition to the sleep state and the control to resume sensing information transmission.

Moreover, in the processing described above, if the frequency of the received signal is determined as not equating to the frequency of a signal transmitted from the aircraft, the instruction unit 13 of the mobile terminal 1 may instruct the module device 3 to release the sleep state. In such a case, when transitioning to the sleep state, the control unit 331 of the module device 3 stops the transmission function of the communication device 306 only, and controls the receiving function to be in the operating state. Then, on the basis of receiving a sleep state release signal transmitted by the mobile terminal 1, the control unit 331 of the module device 3 may recognize the signal, release the sleep state, and activate the communication device 306.

Also in the case where the module device 3 transitions to the sleep state, the control unit 331 of the module device 3 may drive the state sensor 307 and the location sensor 308 and control the transmission/reception functions or only the transmission function of the communication device 306 to be in the sleep state. In such a case, the sensing information acquisition unit 332 of the module device 3 may acquire sensing information from the state sensor 307 or the location sensor 308 and record it in the memory unit 304 of the module device itself. Then, when the communication connection with the mobile terminal 1 is resumed, the control unit 331 of the module device 3 may transmit the sensing information of the state sensor 307 stored in the sleep state to the mobile terminal 1.

Figure 9:
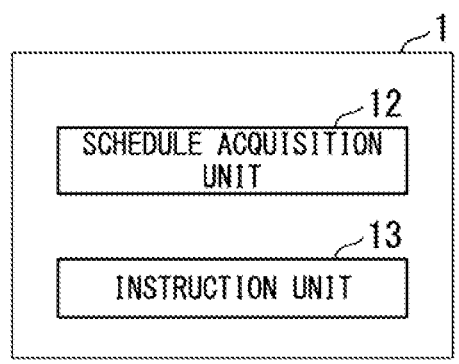
FIG. 9 is a diagram showing a minimum configuration of a mobile terminal according to an exemplary embodiment of the present invention.

FIG. 9 is a diagram showing a minimum configuration of the mobile terminal.

Figure 10:
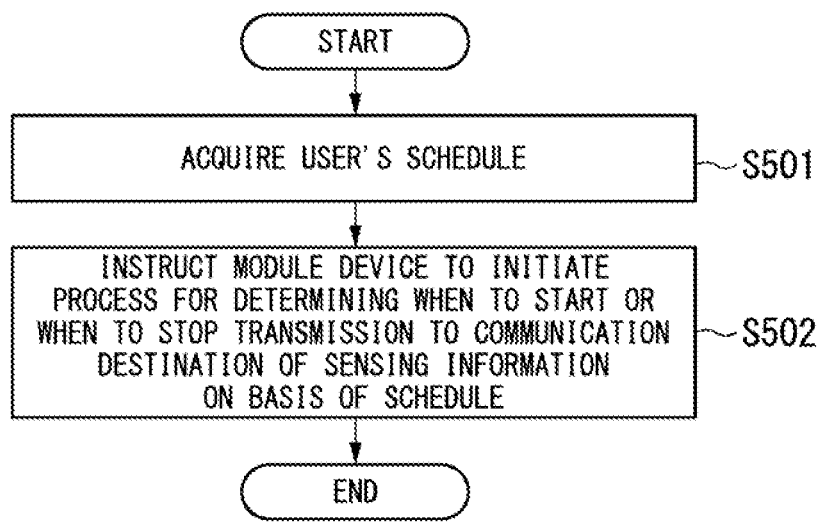
FIG. 10 is a diagram showing a processing flow of a mobile terminal of a minimum configuration according to an exemplary embodiment of the present invention.

FIG. 10 is a diagram showing a processing flow of the mobile terminal of the minimum configuration.

The mobile terminal 1 includes at least a schedule acquisition unit 12 and an instruction unit 13.

The schedule acquisition unit 12 acquires a schedule of a user using the module device 3 that includes a state sensor 307 (Step S501).

The instruction unit 13 instructs the module device 3 to initiate a process for determining when to start or when to stop transmitting sensing information to a communication destination, on the basis of the schedule (Step S502).

Each device described above has a built-in computer system. The process of each processing described above is stored in a computer-readable recording medium in a form of a program, and the processing mentioned above is performed by a computer reading and executing the program. Here, the computer-readable recording medium refers to a magnetic disk, a magnetic optical disk, a CD-ROM, a DVD-ROM, a semiconductor memory, or the like. Moreover, the computer program may be distributed to a computer via a communication line, and the computer having received the distributed program may execute the program.

Also, this program may be a program for realizing some of the functions described above. Furthermore, the program may be a so-called difference file (a difference program) which can realize the functions described above in combination with a program already recorded in the computer system.

REFERENCE SYMBOLS

1: Mobile terminal
3: Module device
10: Cloud server
11, 331: Control unit
12: Schedule acquisition unit
13: Instruction unit
14: Upload unit
332: Sensing information acquisition unit
333: Determination unit
334: Transmission unit

What is claimed is:
1. A module management system comprising:
at least one first memory configured to store instructions; and at least one first processor configured to execute the instructions to:
acquire a schedule of a user regarding boarding of an aircraft, the user using a module device that includes a sensor; and
instruct the module device to initiate a process for determining when to start or when to stop transmitting sensing information detected by the sensor to a communication destination, on the basis of the schedule of the user regarding boarding of the aircraft.

2. The module management system according to claim 1, further comprising the module device,
wherein the module device comprises;
at least one second memory configured to store instructions; and
at least one second processor configured to execute the instructions to:
acquire the sensing information, and
initiate a process for determining when to start or when to stop transmitting the sensing information to the communication destination, on the basis of an instruction to initiate the process for determining.

3. The module management system according to claim 2, wherein
the process for determining when to start or when to stop transmitting the sensing information to the communication destination is performed on the basis of acquired time information.

4. The module management system according to claim 2, wherein
the process for determining when to start or when to stop transmitting the sensing information to the communication destination is performed on the basis of a comparison between acquired schedule information and time information.

5. The module management system according to claim 2, wherein
the process for determining when to start or when to stop transmitting the sensing information to the communication destination is performed on the basis of acquired acceleration information.

6. The module management system according to claim 2, wherein
the process for determining when to start or when to stop transmitting the sensing information to the communication destination is performed on the basis of acquired location information.

7. The module management system according to claim 2, wherein
the process for determining when to start or when to stop transmitting the sensing information to the communication destination is performed on the basis of acquired radio wave information.

8. A module management method comprising:
acquiring a schedule of a user regarding boarding of an aircraft, the user using a module device that includes a sensor; and
instructing the module device to initiate a process for determining when to start or when to stop transmitting sensing information detected by the sensor to a communication destination, on the basis of the schedule of the user regarding boarding of the aircraft.

9. A non-transitory computer-readable program that causes a computer included in a module management system to execute processes, the processes comprising:
acquiring a schedule of a user regarding boarding of an aircraft, the user using a module device that includes a sensor; and
instructing the module device to initiate a process for determining when to start or when to stop transmitting sensing information detected by the sensor to a communication destination, on the basis of the schedule of the user regarding boarding of the aircraft.

* * * * *